United States Patent
Lai

(10) Patent No.: US 10,890,946 B2
(45) Date of Patent: Jan. 12, 2021

(54) STACKING STRUCTURE FOR FLEXIBLE DISPLAY ASSEMBLY

(71) Applicant: Wuhan China Star Optoelectronics Semiconductor Display Technology Co., Ltd., Wuhan (CN)

(72) Inventor: Peiyu Lai, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 36 days.

(21) Appl. No.: 16/339,002

(22) PCT Filed: Dec. 20, 2018

(86) PCT No.: PCT/CN2018/122414
§ 371 (c)(1),
(2) Date: Apr. 3, 2019

(87) PCT Pub. No.: WO2020/024531
PCT Pub. Date: Feb. 6, 2020

(65) Prior Publication Data
US 2020/0142446 A1    May 7, 2020

(30) Foreign Application Priority Data
Aug. 3, 2018   (CN) .......................... 2018 1 0876379

(51) Int. Cl.
*H05K 5/00*   (2006.01)
*G06F 1/16*   (2006.01)
*G09F 9/30*   (2006.01)

(52) U.S. Cl.
CPC ............ *G06F 1/1652* (2013.01); *G09F 9/301* (2013.01)

(58) Field of Classification Search
CPC ..................................................... G02F 1/1339
See application file for complete search history.

(56) References Cited

U.S. PATENT DOCUMENTS

| 2001/0018322 | A1 | 8/2001 | Dow |
| 2017/0133411 | A1 | 5/2017 | Xie et al. |
| 2019/0013487 | A1* | 1/2019 | Park ..................... H01L 51/5284 |
| 2019/0094583 | A1* | 3/2019 | Moon ............... G02F 1/133351 |

FOREIGN PATENT DOCUMENTS

| CN | 104821294 | 8/2015 |
| CN | 106346143 | 1/2017 |
| CN | 107900530 | 4/2018 |
| CN | 108188590 | 6/2018 |

* cited by examiner

Primary Examiner — Jerry Wu

(57) ABSTRACT

A stacking structure for a flexible display assembly is provided, which is advantageous in that, an region of a lower protection film protruding from an region in a flexible display panel, serves as an region for a waste removal device to capture and discharge waste, and meets the needs of the waste removal device for waste removal and the flexible display panel is not contaminated. In addition, a width of an edge removal area of the flexible display panel decreases, a layout efficiency of the irregular-shaped flexible display assembly is thereby improved, and a utilization rate of a master flexible display panel greatly increases to save costs.

12 Claims, 3 Drawing Sheets

STACKING STRUCTURE FOR FLEXIBLE DISPLAY ASSEMBLY

RELATED APPLICATIONS

This application is a National Phase of PCT Patent Application No. PCT/CN2018/122414 having International filing date of Dec. 20, 2018, which claims the benefit of priority of Chinese Patent Application No. 201810876379.0 filed on Aug. 3, 2018. The contents of the above applications are all incorporated by reference as if fully set forth herein in their entirety.

FIELD AND BACKGROUND OF THE INVENTION

The present invention relates to a field of display devices and in particular, to a stacking structure for a flexible display assembly.

A flexible display device is typically a display device manufactured on a flexible substrate, which is characterized by being ultra-light, ultra-thin, bendable, and portable. As the screen sizes of mobile terminal products increase, flexible display devices have broad prospects for application and great market potential in future portable electronic devices and display technology.

In manufacturing, in order to improve production efficiency, a flexible display assembly comprising a flexible panel and a protection film layer are usually formed on a larger-area glass substrate. The flexible display assembly (i.e., the flexible panel and the protection film layer) on the glass substrate is then cut by performing laser cutting for multiple times to obtain multiple small sized flexible display assemblies.

The flexible display assembly has a regular shape after a primary cutting. However, in actual use, in many conditions, an irregular-shaped flexible display assembly is needed. Therefore, the regular-shaped flexible display assembly needs to be cut again to form an irregular-shaped flexible display assembly. The examples are illustrated below.

FIG. 1 is a schematic view of a regular-shaped flexible display assembly 10 before cutting, wherein a boundary line A of an irregular-shaped flexible display assembly 11 is schematically illustrated with dashed lines. FIG. 2 is a schematic cross-sectional view of the flexible display assembly 10, wherein a boundary line A is a laser cutting line. The flexible display assembly 10 comprises a display panel 100 and an upper protection plate 101 and a lower protection plate 102 on both sides of the display panel 100. After laser cutting, an unwanted portion of a margin of the flexible display assembly 10 (a region outside the boundary line A) is removed by a waste removal device 12.

The waste removal device 12 needs to keep a certain distance from the irregular shaped flexible display assembly, so as to prevent the waste removal device 12 from contaminating a chamber of the irregular-shaped flexible display assembly 11. This requires a width W of the cut-off portion to be wide enough, so that the waste removal device 12 can keep a sufficient distance from the chamber of the irregular-shaped flexible display assembly 11, thus preventing the chamber of the irregular-shaped flexible display assembly 11 from being contaminated. For example, the width W of the cut-off portion (the unwanted portion) is greater than 2 mm. As a result, a cut-off portion, which is too wide, tends to lead to a decrease in layout efficiency of an irregular-shaped flexible display assembly 11 on the entire panel, and increases costs greatly.

SUMMARY OF THE INVENTION INVENTION

The present invention provides a stacking structure for a flexible display assembly, which is advantageous in that, the waste removal device can capture and discharge waste without contaminating a flexible display panel. In addition to that, a width of an edge removal region of the flexible display panel decreases, so a layout efficiency of the flexible display assembly is improved, and therefore, a utilization rate of a master flexible display panel greatly increases to save costs.

Accordingly, the present invention provides a stacking structure for a flexible display assembly. The stacking structure comprises:

a flexible display panel;

a lower protection film disposed on a lower surface of the flexible display panel, an edge of the lower protection film protruding from an edge of the flexible display panel, a protruding portion of the lower protection film being used for attaching a waste removal device in laser cutting; and an upper protection film disposed on an upper surface of the flexible display panel, an edge of the upper protection film being flush with an edge of the flexible display panel;

wherein the flexible display panel comprises a reserved region and an edge removal region surrounding the reserved region, and a boundary line between the reserved region and the edge removal region is a laser cutting line; and wherein the stacking structure for the flexible display assembly further comprises a support board, disposed between the flexible display panel and the lower protection film.

According to one embodiment of the present invention, a width of the protruding portion of the lower protection film is greater than 2 mm.

According to one embodiment of the present invention, a thickness of the lower protection film is greater than a thickness of the upper protection film.

According to one embodiment of the present invention, a width of the edge removal region is less than 1 mm.

According to one embodiment of the present invention, an edge of the support board is flush with the edge of the flexible display panel.

Accordingly, the present invention provides a stacking structure for a flexible display assembly, comprising a flexible display panel and a lower protection film disposed on a lower surface of the flexible display panel, wherein an edge of the lower protection film protrudes from an edge of the flexible display panel, and a protruding portion of the lower protection film is used for attaching a waste removal device in laser cutting.

According to one embodiment of the present invention, a width of the protruding portion of the lower protection film is greater than 2 mm.

According to one embodiment of the present invention, an upper protection film is disposed on an upper surface of the flexible display panel, and an edge of the upper protection film is flush with an edge of the flexible display panel.

According to one embodiment of the present invention, a thickness of the lower protection film is greater than a thickness of the upper protection film.

According to one embodiment of the present invention, the flexible display panel comprises a reserved region and an edge removal region surrounding the reserved region, and a boundary line between the reserved region and the edge removal region is a laser cutting line.

According to one embodiment of the present invention, a width of the edge removal region is less than 1 mm.

According to one embodiment of the present invention, the stacking structure for the flexible display assembly further comprises a support board, and the support board is disposed between the flexible display panel and the lower protection film.

According to one embodiment of the present invention, an edge of the support board is flush with the edge of the flexible display panel.

The present invention is advantageous in that, the waste removal device can capture and discharge waste without contaminating the flexible display panel. In addition to that, the width of the edge removal region of the flexible display panel decreases, so a layout efficiency of the flexible display assembly is improved, and therefore, a utilization rate of a master flexible display panel greatly increases to save costs.

BRIEF DESCRIPTION OF THE SEVERAL VIEWS OF THE DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, a person having ordinary skill in this field can obtain other figures according to these figures without an inventive work or paying the premise.

DESCRIPTION OF SPECIFIC EMBODIMENTS OF THE INVENTION

A stacking structure for a flexible display assembly of the present invention is described in detail below with reference to the accompanying drawings.

Figure 1:
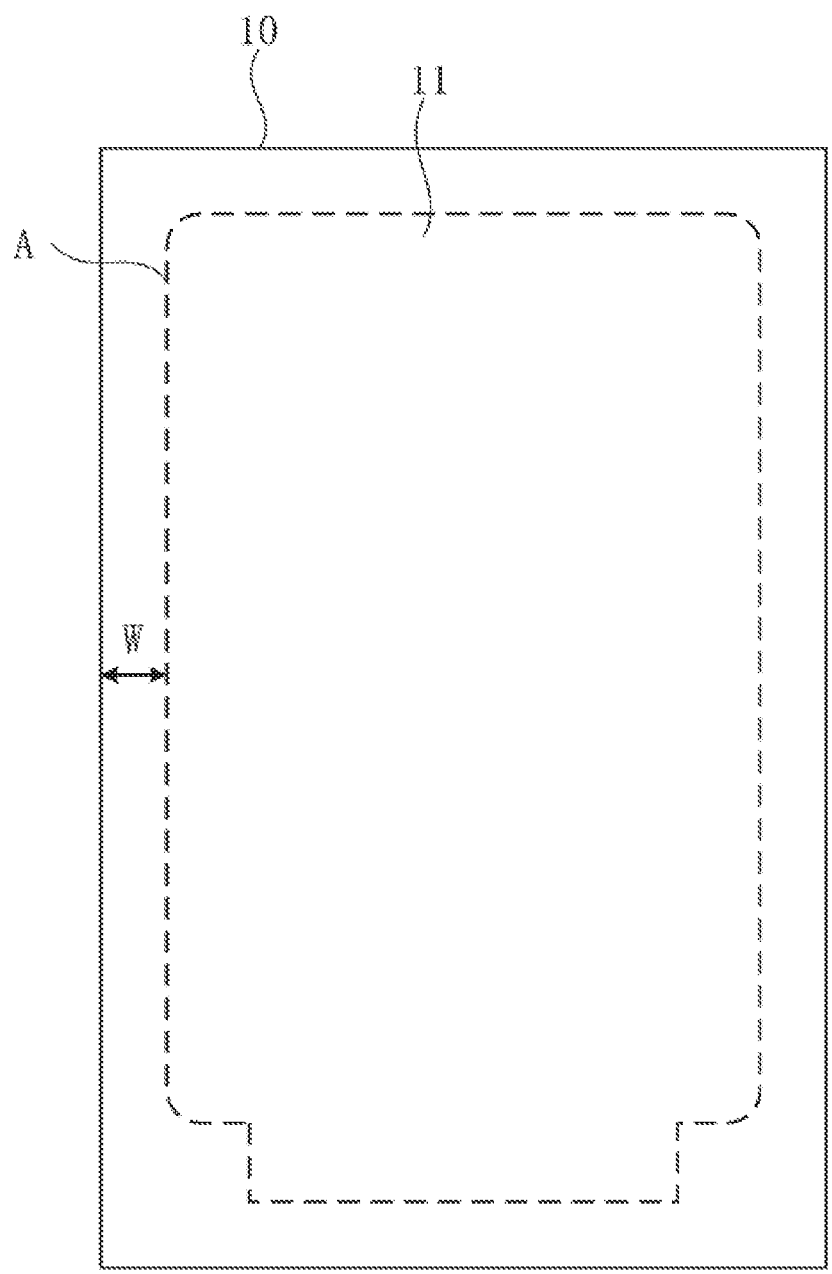
FIG. 1 is a schematic view illustrating a flexible display assembly having a regular shape before cutting.
Figure 2:
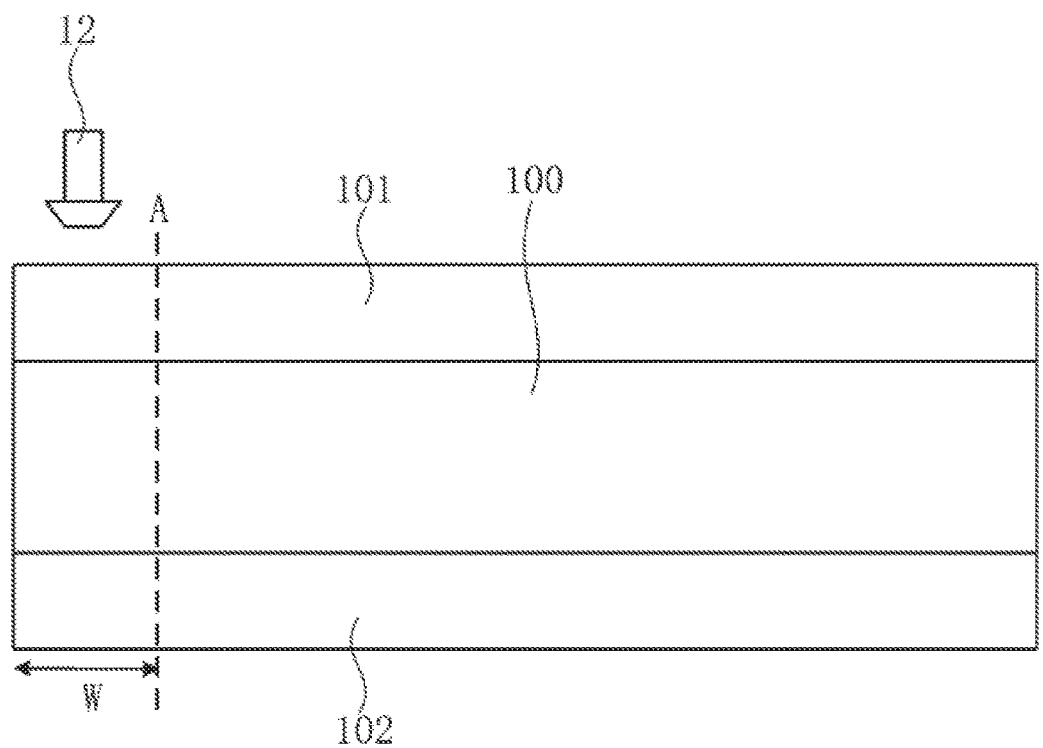
FIG. 2 is a cross-sectional view illustrating the flexible display assembly having the regular shape before cutting.
Figure 3:
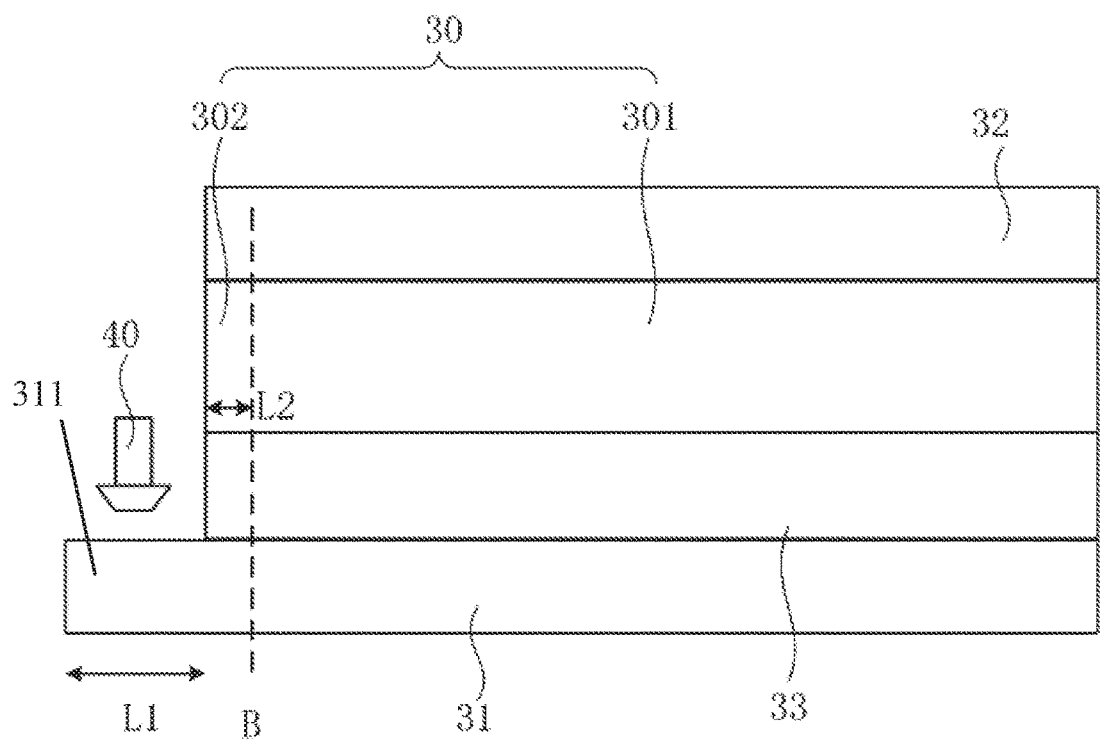
FIG. 3 is a schematic structural view illustrating a stacking structure for the flexible display assembly according to the present invention.
Figure 4:
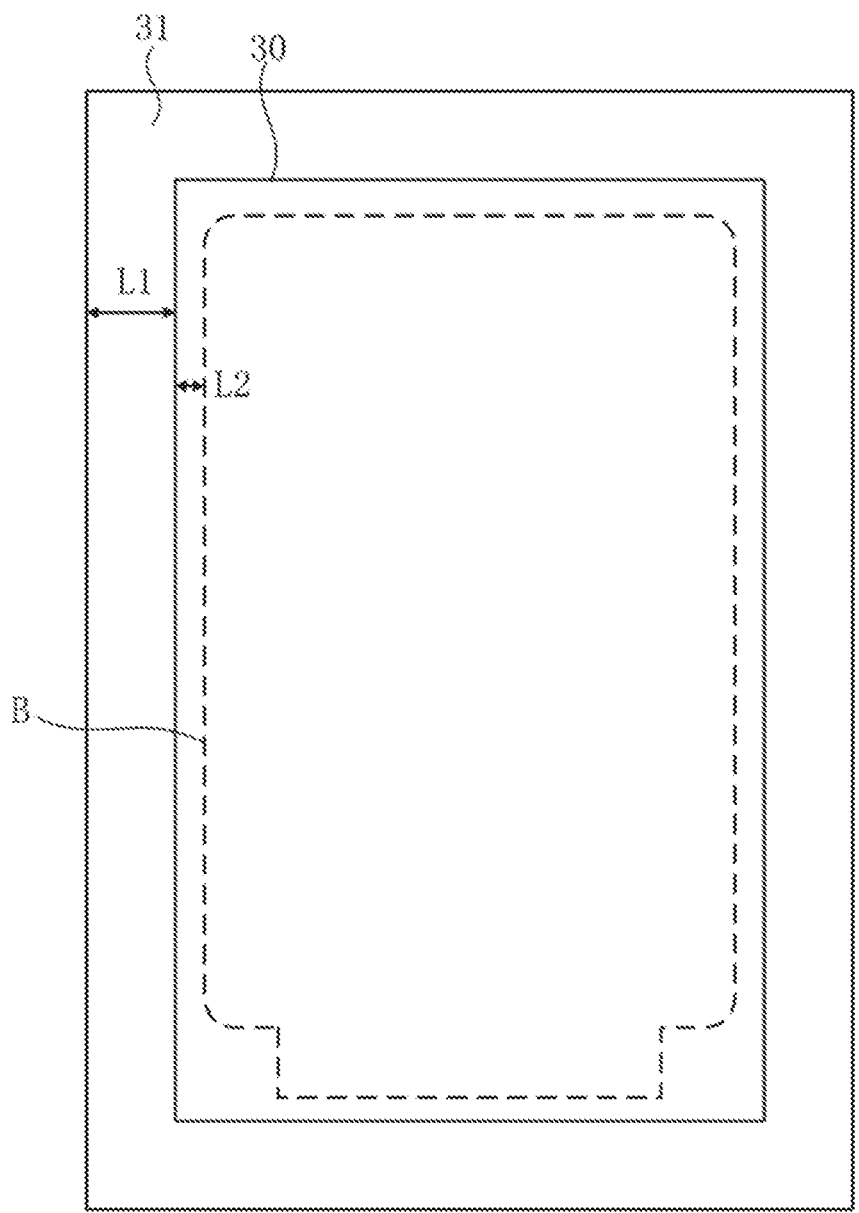
FIG. 4 is a top structural view illustrating the stacking structure for the flexible display assembly according to the present invention.

FIG. 3 is a schematic structural view illustrating a stacking structure for a flexible display assembly according to the present invention. FIG. 4 is a top structure view illustrating the stacking structure for the flexible display assembly according to the present invention. As shown in FIGS. 3 and 4, the stacking structure for the flexible display assembly comprises a flexible display panel 30 and a lower protection film 31 disposed on a lower surface of the flexible display panel 30.

The flexible display panel 30 is a conventional flexible display panel in fields of display devices. For example, it can be an independent flexible display panel cut from a master flexible display panel. The flexible display panel 30 comprises a reserved area 301 and an edge removal area 302 surrounding the reserved area 301. A boundary line B is between the reserved area 301 and the edge removal area 302. The boundary line B is illustrated by dashed lines in FIGS. 3 and 4. The boundary line B is a subsequent cutting line, such as a laser cutting line. As it can be seen from FIG. 3, the boundary line B has an irregular shape. After the flexible display panel 30 is cut along the boundary line B by laser cutting or other methods, the reserved area 301 forms an irregular shaped flexible display panel.

The lower protection film 31 can be attached unto a lower surface of the flexible display panel 30 and can have a shape identical or different from the shape of the flexible display panel 30. In the present embodiment, the shape of the lower protection film 31 is identical with the flexible display panel 30, i.e., a rectangular in shape. The lower protection film 31 serves as a protection structure for the lower surface of the flexible display panel 30, so as to prevent the flexible display panel 30 from being scratched by foreign objects.

An edge of the lower protection film 31 protrudes from an edge of the flexible display panel 30. A protruding portion 311 of the lower protection film 31 is used for attaching a waste removal device in laser cutting. In other words, the edge of the lower protection film 31 protrudes beyond the edge of the flexible display panel 30, and the flexible display panel 30 is not disposed on the protruding portion of the lower protection film 31.

During laser cutting, the waste removal device 40 is attached onto the protruding portion of the lower protection film 31 and does not need the edge removal area 302 attached to the flexible display panel 30. Thus, a width of the edge removal area 302 of the flexible display panel 30 can be reduced under the premise that a chamber of the flexible display panel is not contaminated. Therefore, a layout efficiency of the flexible display assembly of irregular shape is improved, thereby greatly increasing utilization rate of the master flexible display panel and further saving costs.

According to one embodiment of the present invention, a width L1 of the protruding portion of the lower protection film 31 is greater than 2 mm, so as to provide the waste removal device 40 with sufficient space for attaching. A width L2 of the edge removal area 302 is less than one millimeter, which greatly improves a layout efficiency of the flexible display assembly of irregular shape.

Furthermore, an upper protection film 32 is disposed on an upper surface of the flexible display panel 30. The upper protection film 32 can be attached onto the upper surface of the flexible display panel 30 and has a shape the same as the shape of the flexible display panel 30. In the present embodiment, the upper protection film 32 and the flexible display panel 30 both are rectangular in shape. The upper protection film 32 can serve as a protection structure for the upper surface of the flexible display panel 30, so as to prevent the flexible display panel 30 from being scratched by foreign objects. The upper protection film 32 and the lower protection film 31 can be made of the same material such as a material commonly used for protecting flexible display panels and well known by persons skilled in the art.

An edge of the upper protection film 32 is flush with an edge of the flexible display panel 30, and does not protrude beyond the flexible display panel 30, thereby preventing the protruding of the abovementioned upper protection film 32 from affecting the waste removal device 40 to be attached onto the lower protection film 31. For example, if the edge of the upper protection film 32 protrudes beyond the edge of flexible display panel 30, the waste removal device 40 may be partially attached onto the upper protection film 32 when attaching, and as a result, the waste removal device 40 does not effectively attach, thus affecting removal of the edge removal area 302.

A thickness of the lower protection film 31 is greater than a thickness of the upper protection film 32, which is advantageous in that the greater thickness of the lower protective film 31 can bear against attachment of the waste removal device 40 and can also support the edge removal area 302.

In addition, the stacking structure comprises a support board 33. The support board 33 is disposed between the flexible display panel 30 and the lower protection film 31. The lower protection film 31 can serve as a protection structure for the support board 33, so as to prevent the support board 33 from being scratched by foreign objects. After the flexible display panel 30 is removed from a glass substrate, the flexible display panel 30 loses support from the glass substrate, and therefore, it is necessary to provide the support board 33 to support the flexible display panel 30. The flexible display panel 30 is made of material including, but not limited to, polyethylene terephthalate (PET).

Furthermore, in one embodiment of the present invention, an edge of the support board 33 is flush with the edge of the flexible display panel 30, thereby avoiding effecting attachment of the waste removal device 40 to the lower protection film 31. For example, if the edge of the support board 33 protrudes beyond the edge of flexible display panel 30, the waste removal device 40 may be partially attached onto the support board 33 when attached, and as a result, the waste removal device 40 is not effectively attached, thus affecting removal of the edge removal area 302.

In summary, in the stacking structure for the flexible display assembly in the present invention, the edge of the lower protection film protrudes beyond the edge of the flexible display panel.

An advantage of an of the lower protection film as an for the waste removal device to capture removal is that such design can meet the needs of the waste removal device for capturing and discharging waste, and the waste removal device is spaced at a sufficient distance from the flexible display panel to prevent the flexible display panel from being contaminated. Meanwhile, because the waste removal device is prevented from attaching to the edge removal region of the flexible display panel, a width of the edge removal region of the flexible display panel can decrease, a layout efficiency of the irregular-shaped flexible display assembly is thereby improved, and thereby, utilization rate of the master flexible display panel greatly increases to save costs and improve cost benefit. It is to be understood that the above descriptions are merely the preferable embodiments of the present invention and are not intended to limit the scope of the present invention. Equivalent changes and modifications made in the spirit of the present invention are regarded as falling within the scope of the present invention.

The stacking structure for the flexible display assembly of the present invention can be manufactured and used in industries with industrial practicability.

What is claimed is:

1. A stacking structure for a flexible display assembly, comprising a flexible display panel; a lower protection film disposed on a lower surface of the flexible display panel, an edge of the lower protection film comprising a protruding portion protruding from an edge of the flexible display panel, the lower protection film disposed on a lower surface of the flexible display panel; and an upper protection film disposed on an upper surface of the flexible display panel, an edge of the upper protection film being flush with the edge of the flexible display panel; wherein the flexible display panel comprises a reserved region and an edge removal region surrounding the reserved region, and a boundary line between the reserved region and the edge removal region is a laser cutting line; and wherein the stacking structure for the flexible display assembly further comprises a support board disposed between the flexible display panel and the lower protection film; wherein the protruding portion is removeable from the boundary line by a waste removal device after a laser cutting.

2. The stacking structure for the flexible display assembly according to claim 1, wherein a width of the protruding portion of the lower protection film is greater than 2 mm.

3. The stacking structure for the flexible display assembly according to claim 1, wherein a thickness of the lower protection film is greater than a thickness of the upper protection film.

4. The stacking structure for the flexible display assembly according to claim 1, wherein a width of the edge removal region is less than 1 mm.

5. The stacking structure for the flexible display assembly according to claim 1, wherein an edge of the support board is flush with the edge of the flexible display panel.

6. A stacking structure for a flexible display assembly, comprising a flexible display panel and a lower protection film disposed on a lower surface of the flexible display panel, wherein an edge of the lower protection film comprising a protruding portion protrudes from an edge of the flexible display panel, the lower protection film disposed on a lower surface of the flexible display panel; and an upper protection film is disposed on an upper surface of the flexible display panel, and an edge of the upper protection film is flush with the edge of the flexible display panel; wherein the stacking structure for the flexible display assembly further comprises a support board disposed between the flexible display panel and the lower protection film; wherein the flexible display panel comprises a reserved region and an edge removal region surrounding the reserved region, and a boundary line is defined between the reserved region and the edge removal region is a laser cutting line; and wherein the protruding portion is removeable from the boundary line by a waste removal device after a laser cutting.

7. The stacking structure for the flexible display assembly according to claim 6, wherein a width of the protruding portion of the lower protection film is greater than 2 mm.

8. The stacking structure for the flexible display assembly according to claim 6, wherein a thickness of the lower protection film is greater than a thickness of the upper protection film.

9. The stacking structure for the flexible display assembly according to claim 6, wherein the boundary line is a laser cutting line and portions of the lower protection film, the flexible display panel, and the upper protection film in the edge removal region are removed from the boundary line.

10. The stacking structure for the flexible display assembly according to claim 9, wherein a width of the edge removal region is less than 1 mm.

11. The stacking structure for the flexible display assembly according to claim 6, wherein an edge of the support board is flush with the edge of the flexible display panel.

12. The stacking structure for the flexible display assembly according to claim 1, wherein the boundary line extends through the lower protection film, the flexible display panel, and the upper protection film.

* * * * *